United States Patent Office 3,652,725
Patented Mar. 28, 1972

3,652,725
EXTRUSION COATING COMPOSITIONS
Juan C. Diaz and Robert A. Mears, Longview, Tex., assignors to Eastman Kodak Company, Rochester, N.Y.
No Drawing. Filed Sept. 23, 1970, Ser. No. 74,928
Int. Cl. C08f 29/12
U.S. Cl. 260—876 B                          6 Claims

ABSTRACT OF THE DISCLOSURE

Extrusion coating compositions providing coatings having an improved balance of properties including good adhesion to the substrate and substantial elimination of pinholes are disclosed. These coatings are composed of polyethylene, crystalline propylene containing polymer and either a polymerized DAC-B hydrocarbon resin or a vinyl toluene-alpha-methyl styrene copolymer.

This invention relates to a novel polyolefin containing three-component blend providing extrusion coatings having an unexpected and improved combination of properties. One aspect of this invention relates to a novel three component blend capable of providing extrusion coatings having improved balance of physical properties. Another specific aspect of this invention is a three-component extrusion coating composition containing at least two different polyolefins which forms extrusion coatings having improved adhesion and resistance to pinholes.

Extruding a coating of a polyolefin onto a substrate, such as paper, to form an extrusion coated substrate is well known in the art. Various polyethylenes and blends of polyethylenes have been widely used as extrusion coating compositions. These compositions form coatings having poor abrasion and heat resistance, as well as poor barrier properties. In order to improve the coating properties, blends of polyethylene and polypropylene were used as extrusion coating compositions. Note, for example, U.S. Pat. 3,418,396 which describes and claims blends of polypropylene and polyethylene having excellent extrusion coating properties. Although these blends are useful in many applications, they have the disadvantage of poor adhesion to substrates when extrusion coated at melt temperatures low enough to eliminate pinholes in the coating. If the extrusion coating melt temperature is lowered sufficiently to eliminate pinholes, poor adhesion is obtained. Therefore, the usefulness of these blends is limited when thin coatings of 1 mil or less are desired having a combination of good adhesion and few, if any, pinholes. The elimination of pinholes is necessary for coated substrates used in packing fat and oil containing materials.

It is, therefore, an object of the present invention to provide a novel three-component extrusion coating composition.

Another object of the invention is to provide a three-component extrusion coating composition which provides a coating having an improved balance of physical properties.

Another object of this invention is to provide an extrusion coating composition containing a propylene polymer which provides coatings having, in addition to other physical properties, good adhesion and resistance to formation of pinholes.

Further objects of the invention will be apparent from the following description of this invention.

In accordance with this invention, extrusion coating compositions having an improved balance of properties are obtained from a blend of polyethylene, crystalline propylene polymer and DAC-B resin or vinyl-alpha-methyl styrene copolymer. These extrusion coating compositions provide a composition that has high speed coating ability and can also be extruded as very thin coatings of 1 mil or less onto a substrate. These thin coatings have, in addition to other desirable properties, good adhesion to the substrate and substantially no pinholes.

In the extrusion coating of substrates such as paper and paperboard with polypropylene or propylene polymer containing blends, it is known that increasing the melt temperature of the extrudate gives better adhesion. However, as the melt temperature increases, the number of pinholes in the coating increases, particularly at low coating weights (coatings of 1 mil or less). Therefore, even though the polypropylene coatings had good adhesion, the presence of pinholes severely limited the use of polypropylene or propylene containing polymers in extrusion coating applications. For example, the blends of polypropylene and polyethylene disclosed in U.S. Pat. 3,418,396 have excellent extrusion coating properties for some uses. These blends, however, have the disadvantage of poor adhesion to substrates when extrusion coated at melt temperatures low enough to eliminate pinholes in the coating. For example, when these blends are extrusion coated onto kraft paper at a melt temperature of 580° F. to form a 1-mil coating, good adhesion is obtained, but the coated paper has a pinhole count of >100 per sq. ft. If the melt temperature is lowered sufficiently, for example to 540° F., to eliminate pinholes, poor adhesion is obtained. Therefore, the usefulness of these blends is limited, particularly where thin coatings of 1 mil or less are desired having a combination of good adhesion and substantially no pinholes.

The blends of the present invention, however, eliminate the pinhole and adhesion disadvantages of the blends disclosed in U.S. Pat. 3,418,396 by incorporating into these blends a vinyl toluene-alpha-methyl styrene copolymer or DAC-B resin. Examples of such vinyl toluene-alpha-methyl styrene copolymers are the polymers sold under the trade name Piccotex by Pennsylvania Industrial Corporation, Clairton, Pa.; and the preferred copolymers are the polymers sold under the trade name Piccotex 120 and Piccotex LC. The amount of Piccotex contained in the blends of this invention can vary from 0.5 to 10 weight percent based on the total weight of the blend with the preferred range being 1.5 to 5 weight percent.

The DAC-B resin is a hydrocarbon resin prepared by polymerizing DAC-B (debutanized aromatic concentrate B). DAC-B is a complex mixture of saturated and olefinically unsaturated hydrocarbons obtained from the thermal cracking of a hydrocarbon stream to produce ethylene and/or propylene. The preparation and analysis of one such suitable DAC-B and polymer prepared therefrom is described in U.S. Pat. 3,437,629. One such preferred resin has a softening point of about 135° C., a Gardner color of less than 5, less than 3 p.p.m. chlorides and less than 1 percent unsaturation (C=C) and can be produced by the process described in U.S. application Ser. No. 67,333 filed Aug. 27, 1970 by Hugh J. Hagemeyer, Jr., Sam H. Johnson, Jr. and Harold E. Hogan entitled Light-Colored, High Softening Point Hydrocarbon Resins and Method for Their Preparation.

Although U.S. Pat. 3,418,396 is primarily concerned with blends of polypropylene and polyethylene, a crystalline propylene-alpha-monoolefinic block copolymer can be substituted for all or part of the polypropylene in the blends disclosed in the patent. Therefore, the compositions with which the present invention is most concerned are as follows:

| Component | Weight percent contained in composition | | |
|---|---|---|---|
| | Broad range | Preferred range | Most preferred |
| Polypropylene and/or propylene-alpha-monoolefinic copolymer | 30–98.5 | 65–88.5 | 76 |
| Polyethylene | 1–60 | 10–30 | 20 |
| Piccotex | 0.5–10 | 1.5–5 | 4 |
| DAC–B resin | 0.5–10 | 1.5–5 | 2.5 |

The crystalline propylene-alpha-monoolefinic block copolymers useful in the present invention are prepared with stereospecific catalysts by alternate polymerization of propylene and a different alpha-monoolefin or by alternate polymerization of propylene and a mixture of propylene and a different alpha-monoolefin. These copolymers contain at least 80 weight percent polymerized propylene and preferably 90 weight percent. Preferred copolymers are the propylene-ethylene copolymers. Processes for their preparation and the properties of these propylene-alpha-monoolefinic copolymers are contained in U.S. Pat. 3,529,037 issued Sept. 15, 1970.

The properties of the polypropylenes and polyethylenes useful in the present invention are the same as those described for the polypropylenes and polyethylenes in U.S. Pat. 3,418,396.

The important physical properties of the propylene-alpha-monoolefinic copolymers such as flow rate, density, inherent viscosity, and hexane solubility are within the same range as those described for the polypropylenes of U.S. Pat. 3,418,396.

The decision as to whether to use polypropylene, a propylene-alpha-monoolefinic copolymer, or a combination of the two in the blends of this invention will depend primarily on the application for which the blend will be used. If maximum tensile strength, heat resistance, and chemical resistance are needed, polypropylene would be utilized, whereas the copolymer would be used if maximum impact strength, particularly at low temperature, were needed. Regardless of which component is used, the extrusion characteristics are essentially identical.

Since the mechanism of adhesion is not known, it was quite surprising and unexpected when we discovered that the addition of a vinyl toluene-alpha-methyl styrene copolymer to the polypropylene compositions described in U.S. Pat. 3,418,396 would provide an extrusion composition having a combination of good adhesion and no pinholes in thin coatings while at the same time having no adverse effects on the other properties of the composition. This was particularly true in view of the fact that many other additives such as polyterpene resin, ethylene-acrylic acid copolymer, EVA copolymers, and ethylene-propylene rubbers have been tried with no success.

This invention can be further illustrated by the following examples of preferred embodiments thereof, although it will be understood that these examples are included merely for purposes of illustration and are not intended to limit the scope of the invention unless otherwise specifically indicated.

EXAMPLE 1

The following blends are made and extruded to form coatings on a paper or paperboard substrate to show the unexpected adhesion of the blends of the invention. Also, these coatings have excellent pinhole resistance. The blends are formed by tumbling the components in a drum tumbler for 30 minutes, and then homogenizing at a melt temperature of 165° C. in a 3½ MPM extruder equipped with a Maddox compounding screw. The polypropylene employed has a flow rate of 55, a density of 0.917 and an inherent viscosity of 0.96. The polyethylene employed has a melt index of 3.5, a density of 0.917 and a melt index recovery of 65 percent. The vinyl toluene-alpha-methyl styrene copolymer employed is Piccotex 120 having a ring and ball softening point of 120° C. and a specific gravity of 1.04. The Resin H employed is a polymerized DAC–B resin having a ring and ball softening point of 130° C., a color of 4 on the Gardner color scale, and containing less than 2 p.p.m. chlorides.

| | Weight percent in blend | | | |
|---|---|---|---|---|
| | Polypropylene | Polyethylene | Piccotex 120 | Resin H |
| Blend A | 80 | 20 | | |
| Blend B | 76 | 20 | 4 | |
| Blend C | 77.5 | 20 | | 2.5 |

These blends are evaluated in the following manner:

Each blend is fed to a 3½ inch Egan extruder having a barrel length to diameter ratio of 24:1. The four zones of the extruder are maintained from back to front at 400; 500; 540 and 580° F. A metering type screw having six compression flights and twelve metering flights is used. Prior to entering the die the melt passes through one screen 14 x 88 mesh. The die is an Egan die center fed with 1-inch long lands with an opening of 16″ x 0.020″. The melt temperature is held constant at 540° F. The extrusion rate is held constant at 160 lb. per hr. The resulting film extrudate is passed through a 4½ inch air gap into the nip formed by a rubber-covered pressure roll and a chill roll. At the same time 40-pound kraft paper is fed into this nip with the pressure roll in contact with the substrate, the nip pressure applied is 110 lb. per linear inch. The chill roll is a 24-inch diameter matte finish steel roll, water cooled to maintain a temperature of 65° F. on the roll. The coated paper is taken off the chill roll at a point 180° from the nip formed by the pressure roll and chill roll. The chill roll is operated at 400 ft. per min. applying 1-mil thick coating to the substrate. A 1-mil coating is also applied in the same manner to 22 point milk carton stock.

The coatings were rated for adhesion in the following manner:

A strip of ½-inch wide cellophane tape is applied to the coating. The tape is then pulled from the coating. If the coating does not adhere to the tape, adhesion is rated good. If the coating is separated from the substrate by the tape, or with fibers other than surface fibers, adhesion is rated good. If the coating is separated from the substrate, or with only surface fibers adhering to the coating, the sample is rated no adhesion.

| | Adhesion rating | Pinholes * per ft.² |
|---|---|---|
| Blend A | No adhesion | 0 |
| Blend B | Good | 0 |
| Blend C | do | 0 |

* Determined by procedure listed in U.S. Patent 3,418,396.

EXAMPLE 2

The following blends are extruded as coatings according to the procedure of Example 1. The polypropylene and polyethylene used are the same as in Example 1. These blends show that Piccotex 120 and DAC–B resin provide coatings having unexpected properties when compared with other additives commonly used by the art in extrusion coating compositions.

| Blend No. | Weight percent in blend | | |
|---|---|---|---|
| | Poly-propylene | Poly-ethylene | Additive |
| 1 | 80 | 20 | 0. |
| 2 | 75 | 20 | 5 (ethylene-acrylic acid copolymer). |
| 3 | 75 | 20 | 5 (ethylene-vinyl acetate copolymer-Elvax 240, 25 MI). |
| 4 | 75 | 20 | 5 (polyterpene resin-Nirez 1115, ring and ball soft. pt. 115° C.). |
| 5 | 75 | 20 | 5 (ethylene propylene rubber-EPR 404, Mooney viscosity 29, i.v. 2.9, sp. gr. 0.86). |
| 6 | 75 | 20 | 5 (ethylene propylene terpolymer-EPT 3509, Mooney viscosity 70, sp. gr. 0.86). |
| 7 | 75 | 20 | 5 (polyethylene oxide-polyox WSR-205, mol. wt. 600,000, melting pt. 65° C., sp. gr. 1.21). |
| 8 | 75 | 20 | 5 (polystyrene-shell polystyrene 303). |

All the above blends have an adhesion rating of "No adhesion."

EXAMPLE 3

Example 1 is repeated with the exception that the melt temperature of the extrudate is maintained at 580° F. instead of 540° F. The adhesion ratings and pinhole count of the coatings are as follows:

| | Adhesion rating | Pinholes per ft.$^2$ |
|---|---|---|
| Blend A | Good | 100 |
| Blend B | do | 25 |
| Blend C | do | 27 |

This demonstrates the improved pinhole resistance of the blend of this invention compared to prior art.

EXAMPLE 4

Example 1 is repeated with the exception that a crystalline propylene-ethylene block copolymer (30 flow rate-1.6 percent ethylene) is substituted for the polypropylene component in the blends. The results are as follows:

| | Adhesion rating | Pinholes per ft.$^2$ |
|---|---|---|
| Blend A | No adhesion | 0 |
| Blend B | Good | 0 |
| Blend C | do | 0 |

The extrusion coating compostions of the present invention can be extrusion coated onto substrates such as paper and paperboard. The coated substrates can be used in applications such as food trays, bags or packages for greasy materials such as dog food, potato chips, release papers and the like. One particular application for the coatings is the use of an extrusion coated paperboard as a food tray for packaging meals such as lunches which prior to serving can be quickly heated by a radiation device such as a microwave range or oven. These compositions, therefore, provide very thin extrusion coatings having good abrasion and heat resistance, excellent adhesion to the substrate and good barrier properties.

The invention has been described in detail with particular reference to preferred embodiments thereof, but it will be understood that variations and modifications can be effected within the spirit and scope of the invention.

We claim:

1. An extrusion coating composition capable of providing extrusion coatings of 1-mil thickness characterized by good adhesion and pinhole resistance properties consisting essentially of 1 to 60 weight percent polyethylene, 30 to 98.5 weight percent crystalline propylene containing polymer selected from the group consisting of polypropylene and propylene-alpha-monoolefinic block copolymer containing at least 80 weight percent polymerized propylene and about 0.5 to 10 weight percent of either vinyl toluene-alpha-methyl styrene copolymer or DAC–B hydrocarbon resin.

2. An extrusion coating composition according to claim 1 consisting essentially of 10 to 30 weight percent polyethylene, 65 to 88.5 weight percent crystalline propylene containing polymer and 1.5 to 5 weight percent of either vinyl toluene-alpha-methyl styrene copolymer or DAC–B hydrocarbon resin.

3. An extrusion coating composition according to claim 2 consisting essentially of about 20 weight percent polyethylene, about 76 weight percent crystalline propylene containing polymer and about 4 weight percent vinyl toluene-alpha-methyl styrene copolymer.

4. An extrusion coating composition according to claim 3 wherein said vinyl toluene-alpha-methyl styrene copolymer has a ring and ball softening point of 120° C. and a specific gravity of 1.04.

5. An extrusion coating composition according to claim 2 consisting essentially of about 20 weight percent polyethylene, about 77.5 weight percent crystalline propylene containing polymer and about 2.5 weight percent DAC–B hydrocarbon resin.

6. An extrusion coating composition according to claim 5 wherein said DAC–B hydrocarbon resin has a softening point of 130° C., a Gardner color of less than 5, less than 3 p.p.m. chlorides and less than 1 percent unsaturation (C=C).

References Cited
UNITED STATES PATENTS 3,243,396  3/1966  Hammer _____ 260—28.5
3,247,142  4/1966  Brunson et al. _____ 260—23

JOHN C. BLEUTGE, Primary Examiner

C. SECCURO, Assistant Examiner

U.S. Cl. X.R.

117—155 UA; 260—897 A, 897 B, 897 R